(12) United States Patent
Meldrim

(10) Patent No.: US 8,659,727 B2
(45) Date of Patent: Feb. 25, 2014

(54) BARRIERS FOR REFLECTIVE PIXEL ELECTRODES OF DISPLAY DEVICES AND METHODS

(75) Inventor: Mark Meldrim, Boise, ID (US)

(73) Assignee: Citizen Finetech Miyota Co., Ltd., Nagano (JP)

( * ) Notice: Subject to any disclaimer, the term of this patent is extended or adjusted under 35 U.S.C. 154(b) by 156 days.

(21) Appl. No.: 13/191,606

(22) Filed: Jul. 27, 2011

(65) Prior Publication Data

US 2013/0027651 A1    Jan. 31, 2013

(51) Int. Cl.
*G02F 1/1335* (2006.01)

(52) U.S. Cl.
USPC ............................................. 349/113

(58) Field of Classification Search
USPC ............................................. 349/113
See application file for complete search history.

(56) References Cited

U.S. PATENT DOCUMENTS

| 7,781,031 B2 | 8/2010 | Breitung et al. | |
|---|---|---|---|
| 2005/0099560 A1* | 5/2005 | Suzuki et al. | 349/113 |
| 2008/0238292 A1 | 10/2008 | Yamamoto et al. | |
| 2008/0290314 A1 | 11/2008 | Lee et al. | |
| 2010/0313943 A1 | 12/2010 | Knoll et al. | |

FOREIGN PATENT DOCUMENTS

| JP | 10082995 A | * 3/1998 |
|---|---|---|
| WO | WO 2010/002182 | 1/2010 |

* cited by examiner

*Primary Examiner* — James Dudek

(57) ABSTRACT

In one or more embodiments, barriers for reflective pixels electrodes of display devices and methods are disclosed. In one such embodiment, a reflective spatial light modulator for a display device has a plurality of reflective pixel electrodes. Each reflective pixel electrode may include a conductor, a tantalum containing barrier over the conductor, and a conductive reflector over the conductive barrier.

20 Claims, 11 Drawing Sheets

BARRIERS FOR REFLECTIVE PIXEL ELECTRODES OF DISPLAY DEVICES AND METHODS

FIELD

The present disclosure relates generally to display devices and, in particular, in one or more embodiments, the present disclosure relates to barriers for reflective pixel electrodes of display devices and methods.

BACKGROUND

Projectors, such as picoprojectors, electronic viewfinders of digital cameras, displays of portable devices, such as personal digital assistants (PDAs) and mobile telephones, and the like sometimes employ image display systems (e.g., sometimes called virtual image display systems), such as liquid crystal display systems, e.g., ferroelectric liquid crystal display systems, nematic liquid crystal display systems, etc. Liquid crystal display systems may include a spatial light modulator, such as a reflective spatial light modulator, a light source for illuminating the spatial light modulator, and optics for directing light from the light source into the spatial light modulator and for directing certain portions of the light reflected from the spatial light modulator to a desired viewing area.

A reflective spatial modulator may include liquid crystal material, such as ferroelectric liquid crystal material, nematic liquid crystal material, or the like. The liquid crystal material may be between a common electrode that is transparent to light and an array of reflective pixel electrodes. For example, each reflective pixel electrodes may correspond to a pixel of the display device and thus an image produced by the display device.

The state of the liquid crystal material between a reflective pixel electrode and the common electrode, and thus the state of the corresponding pixel, can be changed by changing an electric field in the liquid crystal material in response to changing a voltage differential between the reflective pixel electrode and the common electrode. That is, the liquid crystal material can transmit the light reflected from the reflective pixel electrode, and thus the corresponding pixel, when in one state (e.g., ON) and can restrict transmission of the light to the reflective conductor, and thus the corresponding pixel, when in another state (e.g., OFF). Selectively, changing the states of the pixels generates images that are directed to the desired viewing area. It will be appreciated that image quality may be impacted by the amount of light that is reflected from each pixel during the ON state, and thus the reflectivity of the respective reflective pixel electrode.

For the reasons stated above, and for other reasons stated below which will become apparent to those skilled in the art upon reading and understanding the present specification, there is a need in the art for alternatives to reflective pixel electrodes in existing liquid crystal display systems and their formation.

DETAILED DESCRIPTION

Figure 1:
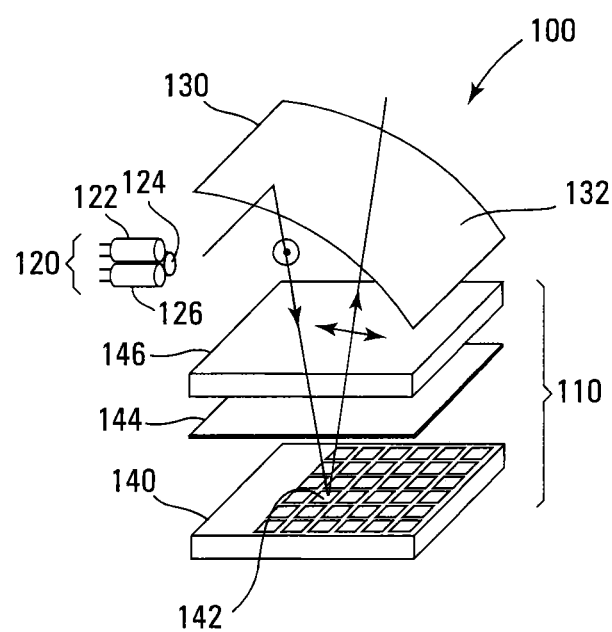
FIG. 1 is an exploded perspective view, illustrating an image display system, according to an embodiment.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural, logical, chemical, and electrical changes may be made without departing from the scope of the present disclosure. The following detailed description is, therefore, not to be taken in a limiting sense.

FIG. 1 is an exploded perspective view, illustrating an image display system 100, such as a liquid crystal image display system, e.g., a ferroelectric liquid crystal display system, nematic liquid crystal display system, etc. For example, image display system 100 may be a part of a projector, such as a picoprojector, an electronic viewfinder of digital camera, a display of a portable electronic device, such as personal digital assistant (PDA), a mobile telephone, or the like. Image display system 100 may include a reflective spatial light modulator 110 in accordance with embodiments of the present disclosure. Image display system 100 may include a light source 120 for illuminating spatial light modulator 110 and optics 130 for directing light from the light source 120 into spatial light modulator 110 and for transmitting light reflected from spatial light modulator 110 for display, such as by the projector, the electronic viewfinder, the display of a portable electronic device, etc.

Light source 120 may be a color light source that can generate multiple colors, e.g., red, blue, and green light. For example, light source may include a red light source 122, such as a red light emitting diode (LED), a blue light source 124, such as a blue LED, and a green light source 126, such as a green LED. Optics 130 may include a polarizing beam splitter 132 that reflects a portion of the light (e.g., about half) from light source 120 into reflective spatial light modulator 110 and that transmits light reflected from reflective spatial light modulator 110.

Figure 2:
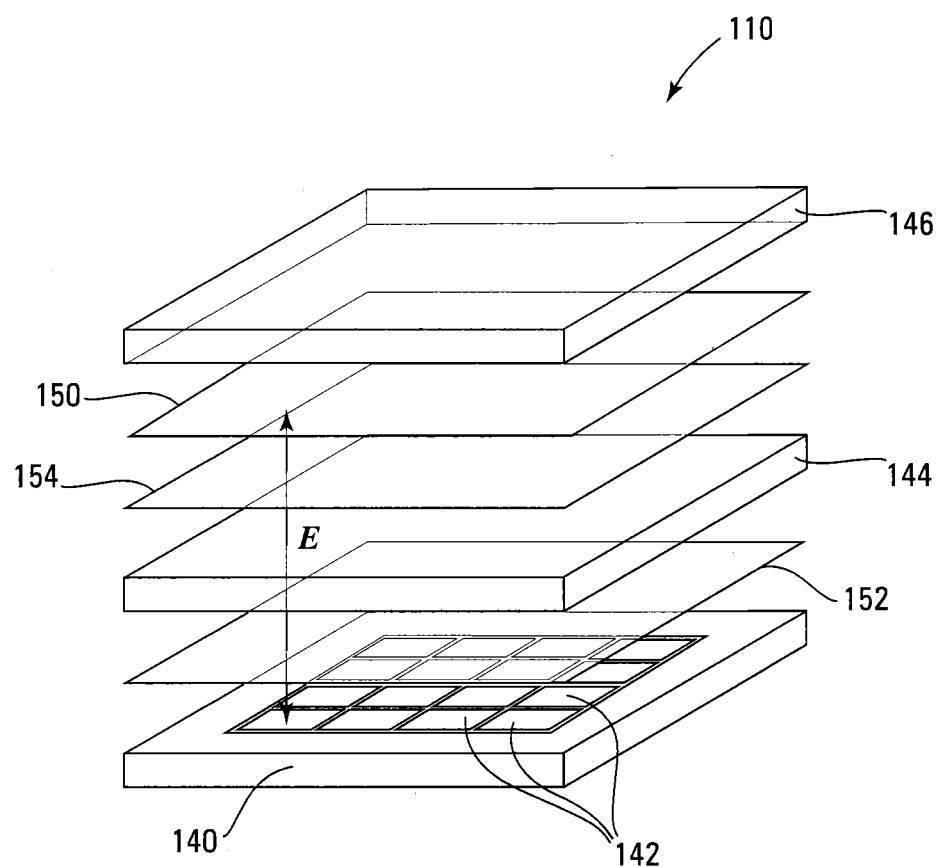
FIG. 2 is an exploded perspective view of an example of a reflective spatial modulator, according to another embodiment.

FIG. 2 is an exploded perspective view of an example of a reflective spatial modulator 110. Reflective spatial modulator 110 may include an array 140 of reflective pixel electrodes 142, each defining a pixel of reflective spatial light modulator 110 and of image display system 100. For example, each reflective pixel electrode 142 may correspond to a pixel of image display system 100 and of the finally displayed images generated by image display system 100.

Each reflective pixel electrode 142 may include a barrier, including a tantalum containing material, such as tantalum nitride (e.g., TaN, Ta2N, or sub-stoichiometric tantalum nitride) or tantalum, between a reflector, including a conductive material such as silver, gold, cobalt, or nickel, and a conductor, including a conductive material such as aluminum, copper, titanium, titanium nitride, tungsten, etc., according to the disclosed embodiments.

Liquid crystal material 144, e.g., ferroelectric liquid crystal material or nematic liquid crystal material, may be over array 140, as shown in FIGS. 1 and 2. A transparent conductor 150, e.g., a common transparent conductor, may be over liquid crystal material 144 so that liquid crystal material 144 is between conductor 150 and array 140, as shown in FIG. 2. For example, transparent conductor 150 may be referred to as a transparent common electrode. For some embodiments, conductor 150 may be of indium tin oxide. A transparent material 146, such as a substantially clear glass plate, may be over conductor 150, and thus between polarizing beam splitter 132 and liquid crystal material 144, as shown in FIG. 1. Note that term "transparent" as used herein refers to something, e.g. transparent conductor 150 and transparent material 146, that permits transmission of at least a portion of one or more wavelengths of light.

An alignment material 152 may be between liquid crystal material 144 and array 140, and an alignment material 154 may be between liquid crystal material 144 and conductor 150, as shown in FIG. 2. Alignment materials 152 and 154 may act to orient the liquid crystal molecules in liquid crystal material 144 and provide boundary conditions for desired switching modes of liquid crystal material 144. Alignment materials 152 and 154 may be rubbed polymers, for example, and may have a series of grooves in their surfaces that act to orient the liquid crystal molecules.

A reflective pixel electrode 142 is in an ON state when a portion of liquid crystal material 144 adjacent to an reflective pixel electrode 142 allows light, received from polarizing beam splitter 132 and reflected from the reflective pixel electrode 142, to pass through the portion of liquid crystal material 144, as shown in FIG. 1. This may occur in response to producing a particular electric field E in the portion of liquid crystal material 144 adjacent to the reflective pixel electrode 142 by applying a voltage differential between conductor 150 and the reflective pixel electrode 142, e.g., by applying different voltages to conductor 150 and the reflective pixel electrode 142. The light may then pass through polarizing beam splitter 132 for display.

Changing the electric field E in the portion of liquid crystal material 144 adjacent to the reflective pixel electrode 142 causes the portion of liquid crystal material 144 adjacent to the reflective pixel electrode 142 to restrict (e.g., in some cases prevent) light from passing through to the reflective pixel electrode 142. This corresponds to the OFF state of the reflective pixel electrode 142. For example, electric field E may be changed by changing the voltage differential between conductor 150 and the reflective pixel electrode 142, such as by changing the voltage on the reflective pixel electrode 142 and leaving the voltage of conductor 150 as it was in the ON state.

Figure 3:
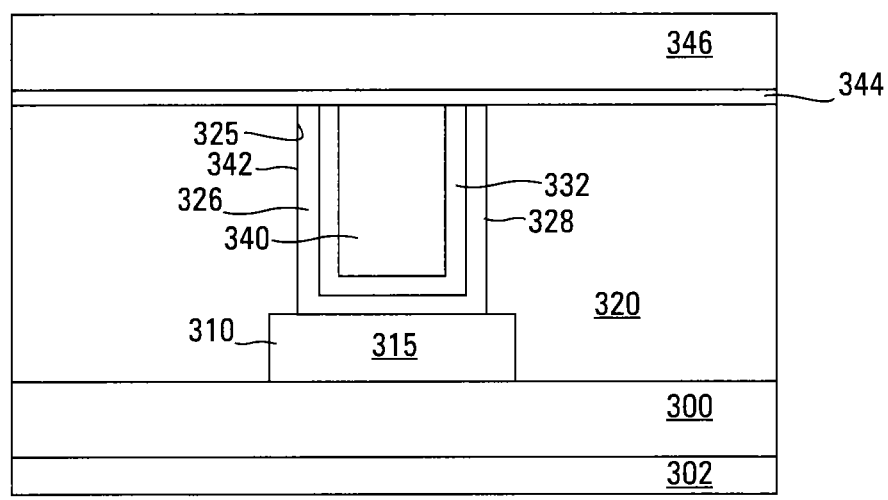
FIG. 3 is cross-sectional view of a partially formed portion of a reflective pixel array.

FIG. 3 is cross-sectional view of a partially formed portion of a reflective pixel array, such as a portion of the pixel array 140 of FIGS. 1 and 2, at a particular stage of fabrication after several processing steps have occurred. In general, the structure of FIG. 3 may be formed by forming a dielectric 300 over a substrate 302, such as a semiconductor, e.g., that may include silicon. Dielectric 300 is generally formed of one or more dielectric materials. For example, dielectric 300 may be formed from an oxide, e.g., silicon oxide, an oxynitride, e.g., silicon oxynitride, nitride, etc.

A conductive material 310 may be formed over dielectric 300. Conductive material 310 is generally formed of one or more conductive materials, and can include, for example, metals, such as aluminum, copper, etc. Regions of conductive material 310 may then be patterned for removal. For example, for some embodiments, a mask (not shown), e.g., imaging resist, such as photo-resist, may be formed over conductive material 310 and patterned to define regions of conductive material 310 for removal. The regions of conductive material 310 defined for removal are subsequently removed, e.g., by etching. The remaining portions of conductive material 310 may respectively form a plurality of conductors 315, one of which is shown in FIG. 3. Each of the conductors 315 may form a portion of a reflective pixel electrode, such as a reflective pixel electrode 142 shown in FIGS. 1 and 2.

A dielectric 320 (e.g., an interlayer dielectric) may then be formed over dielectric 300 and conductors 315. Dielectric 320 is generally formed of one or more dielectric materials. For example, dielectric 320 may be formed from an oxide, e.g., silicon oxide, an oxynitride, e.g., silicon oxynitride, nitride, etc.

A plurality of openings 325 (e.g., vias), one of which is shown in FIG. 3, may then be formed by patterning dielectric 320 and removing portions of dielectric 320. For example, for some embodiments, a mask (not shown), e.g., imaging resist, such as photo-resist, may be formed over dielectric 320 and patterned to define regions of dielectric 320 for removal. The regions defined for removal are subsequently removed, e.g., by etching, to form openings 325 that may terminate on or within respective ones of conductors 315. That is, each opening 325 exposes at least a portion of a respective one of the conductors 315.

For some embodiments, a conductive liner 326 may then be formed in each opening 325, e.g., over dielectric 320 and over the exposed portion of the conductor 315 at the bottom of the respective opening 325. For example, conductive liner 326 may be formed over portions of dielectric 320 that form the sidewalls of an opening 325 and the over the conductor 315 at the bottom of each opening 325. Conductive liner 326 is generally formed of one or more conductive materials. For example, conductive liner 326 may include a conductive material 328 and a conductive material 332 over conductive material 328.

Conductive material 328 may be formed in each opening 325, e.g., over dielectric 320 and over the exposed portion of the conductor 315 at the bottom of the respective opening 325. For example, conductive material 328 may be formed over portions of dielectric 320 that form the sidewalls of an opening 325 and the over the conductor 315 at the bottom of each opening 325. Conductive material 328 may act as an adhesion material and may be metal, such as titanium or any other conductive material suitable as an adhesion material to the underlying conductor 315. Conductive material 332 may then be formed over conductive material 328 in each opening 325. Conductive material 332 may act as a barrier material and may be titanium nitride or any other conductor suitable as a barrier material to restrict undesirable diffusion to underlying materials.

A conductive material 340 may then be formed over conductive material 332 in each opening 325. Conductive material 340 is generally formed of one or more conductive materials. For example, conductive material 340 may be metal, such as tungsten.

Conductive material 340 may be deposited, e.g., using blanket deposition, so as to overfill openings 325. Conductive material 340 may then be planarized, e.g., using chemical mechanical planarization (CMP), so that an upper surface of conductive material 340 formed in each opening 325 is substantially flush with the ends of conductive materials 328 and 332 and the upper surface of dielectric 320, as shown in FIG. 3. In some examples, conductive material 340 over conductive liner 326 may be referred to as a conductor (e.g., a conductive via plug) 342 that substantially fills an opening 325.

A conductive material 344 may then be formed over conductors 342 and dielectric 320. Conductive material 344 is generally formed of one or more conductive materials. For example, conductive material 344 may be metal, such as titanium.

Subsequently, a conductive material 346 may be formed over conductive material 344. Conductive material 346 is generally formed of one or more conductive materials. For example, conductive material 346 may be metal, such as aluminum, copper, titanium, titanium nitride, tungsten, etc. For some embodiments, e.g., for embodiments where conductive material 346 is titanium, titanium nitride, or tungsten, conductive material 344 may be omitted. However, for embodiments, where conductive material 344 is present, conductive material 344 may act as an adhesion material between conductors 342 and conductive material 346.

FIGS. 4A-4D are cross-sectional views of the portion of the reflective pixel array in FIG. 3 during various stages of fabrication subsequent to the particular stage of fabrication of FIG. 3, according to an embodiment. For example, FIGS. 4A-4D illustrate an embodiment of the formation of conductor stacks of reflective pixel electrodes, such as the reflective pixel electrodes 142 in FIGS. 1 and 2.

Figure 4A:
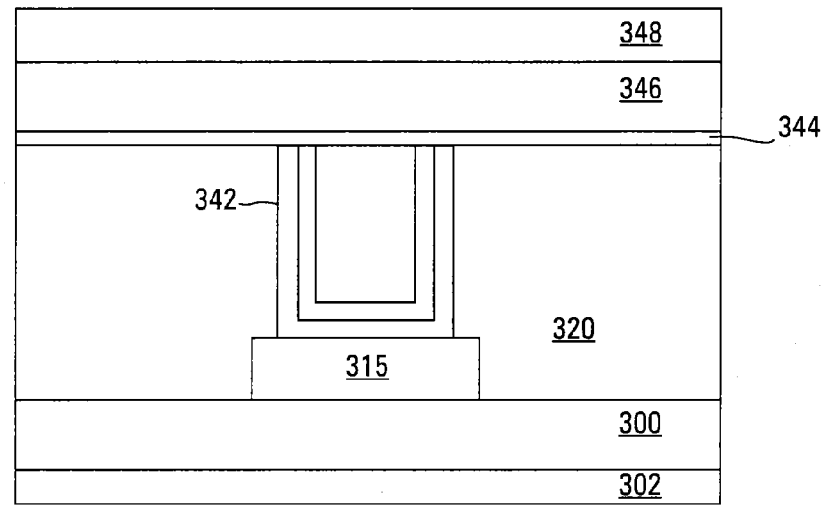
FIGS. 4A-4D are cross-sectional views of the portion of the reflective pixel array in FIG. 3 during various stages of fabrication subsequent to the particular stage of fabrication of FIG. 3, according to another embodiment.

A barrier material 348 may be formed over (e.g., in direct physical contact with) conductive material 346 in FIG. 4A. Barrier material 348 may be a conductor, such as metal or a metal containing material. For some embodiments, barrier material 348 may be a tantalum containing barrier material. For example, the tantalum containing barrier material may comprise a conductive barrier material selected from the group consisting of tantalum nitride (e.g., TaN, Ta2N, or sub-stoichiometric tantalum nitride) and tantalum. Barrier material 348 may be selected to restrict (e.g., in some cases substantially prevent) migration (e.g., diffusion) of conductive material 346 into a reflective material, such as silver, gold, cobalt, nickel, etc., to be formed over barrier material 348, and migration (e.g., diffusion) of the reflective material into conductive material 346, thus restricting (e.g., in some cases substantially preventing) intermixing between the conductive material 346 the reflective material.

Figure 4B:
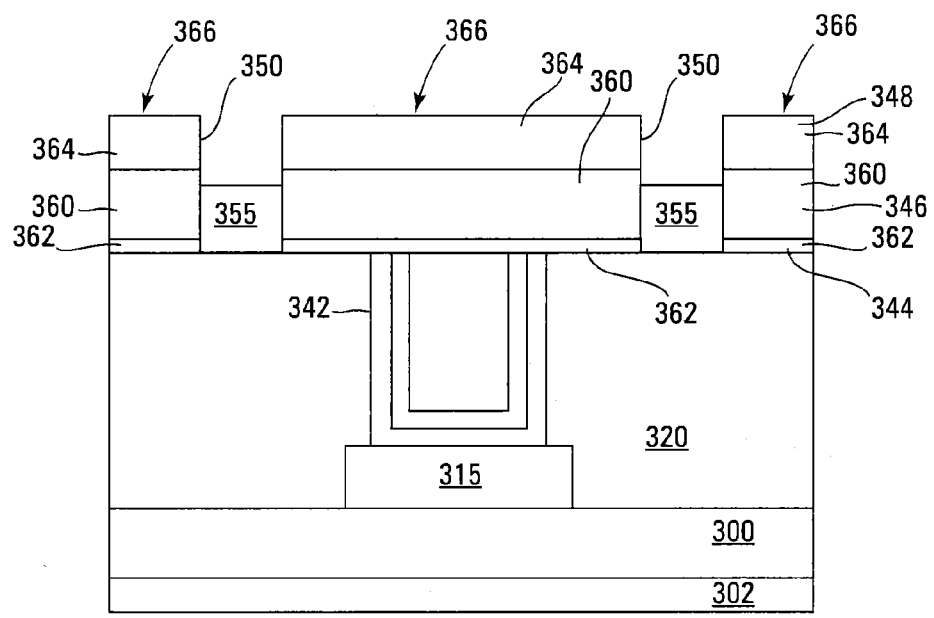

Openings 350 may then be formed by patterning barrier material 348 and removing portions of barrier material 348 and portions of conductive material 346 and portions of conductive material 344 exposed by patterned barrier material 348, as shown in FIG. 4B. For example, for some embodiments, a mask (not shown), e.g., imaging resist, such as photo-resist, may be formed over barrier material 348 and patterned to define regions of barrier material 348, conductive material 346, and conductive material 344 for removal. The regions defined for removal are subsequently removed, e.g., by etching, to form openings 350 that may respectively terminate on or within dielectric 320.

A dielectric plug 355, e.g., a dielectric spacer, may then be formed in each of openings 350, as shown in FIG. 4B. Dielectric plug 355 is generally formed of one or more dielectric materials. For example, dielectric plug 355 may be formed from an oxide, e.g., silicon oxide, an oxynitride, e.g., silicon oxynitride, nitride, TEOS (tetraethylorthosilicate), etc. The one or more dielectric materials of each dielectric plug 355 may fill or partially fill openings 350. A portion of the one or more dielectric materials may then be removed, such as by etching in an etch-back process, so that upper surfaces of the dielectric plugs 355 are recessed within the respective openings 350, e.g., below an upper surface of conductive material 346.

Openings 350, containing dielectric plugs 355, are between adjacent remaining portions of barrier material 348. Each remaining portion of barrier material 348 may be over a remaining portion of conductive material 346, and each remaining portion of conductive material 346 may be over a remaining portion of conductive material 344, as shown in FIG. 4B.

Each remaining portion of conductive material 344 may be referred to as a conductor 362, e.g., of an individual reflective pixel electrode, such as a reflective pixel electrode 142 of FIGS. 1 and 2, and each remaining portion of conductive material 346 may be referred to as a conductor 360 of the individual reflective pixel electrode. Each remaining portion of barrier material 348 may be referred to as a barrier 364, e.g., an electrically conductive barrier, of the individual reflective pixel electrode.

Figure 5:
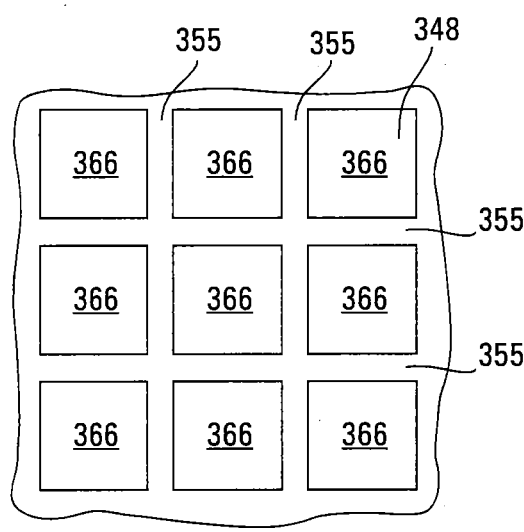
FIG. 5 is a top view illustrating a layout of conductive pads of reflective pixel electrodes, according to another embodiment.

A structure including a barrier 364 over a conductor 360 that is over a conductor 362 may be referred to as a pad 366, e.g., a conductive pad, of a reflective pixel electrode 142. Openings 350, containing dielectric plugs 355, may define a plurality of individual (e.g., separate) electrically isolated pads 366, as shown in FIG. 4B and in FIG. 5, a top view showing a layout of pads 366, according to another embodiment. That is, openings 350, containing dielectric plugs 355, may electrically isolate adjacent pads 366 from each other. For example, each reflective pixel electrode may include a pad 366, where the openings 350, containing dielectric plugs 355, are between adjacent pads 366 and thus reflective pixel electrodes. Each conductor 362, and thus each pad 366, may be electrically and physically coupled to a respective one of conductors 315 of the respective reflective pixel electrode by a conductor 342 of the respective reflective pixel electrode.

Figure 4C:
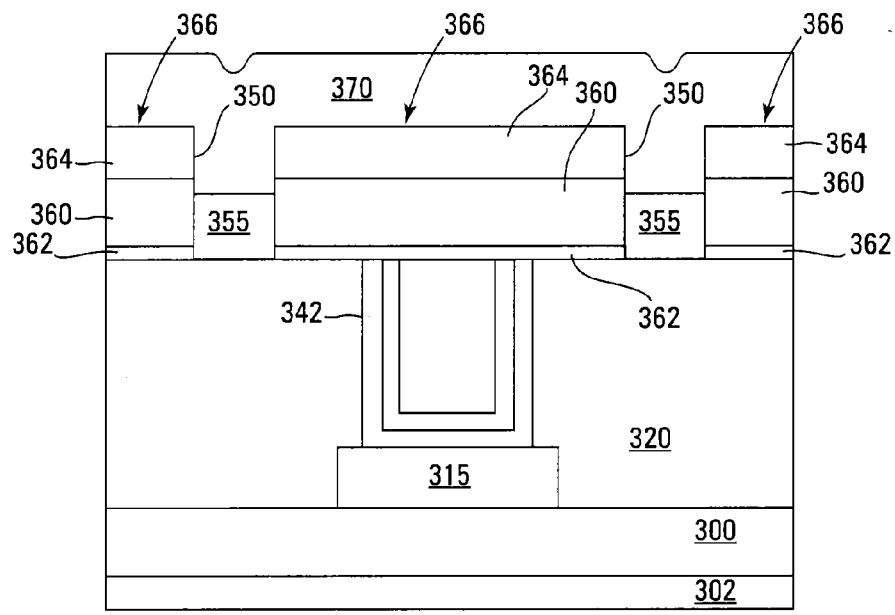

A reflective conductive material 370 may then be formed over (e.g., in direct physical contact with) barriers 364 of pads 366 and in openings 350 over dielectric plugs 355 in FIG. 4C. For example, reflective conductive material 370 may be deposited using blanket deposition, such as physical vapor deposition or chemical vapor deposition. Note that conductive material 370 may overfill the remainder of each of openings 350 above a respective dielectric plug 355. Conductive material 370 may be a reflective metal, such as silver, gold, cobalt, nickel, etc.

Conductive material 370 may then be planarized, e.g., using chemical mechanical planarization (CMP). For some embodiments, the upper surface of conductive material 370 may be buffed as part of a buff CMP to reduce the roughness of the upper surface of conductive material 370. Buffing may act to increase the reflectivity of the resulting reflective pixel electrodes.

Figure 4D:
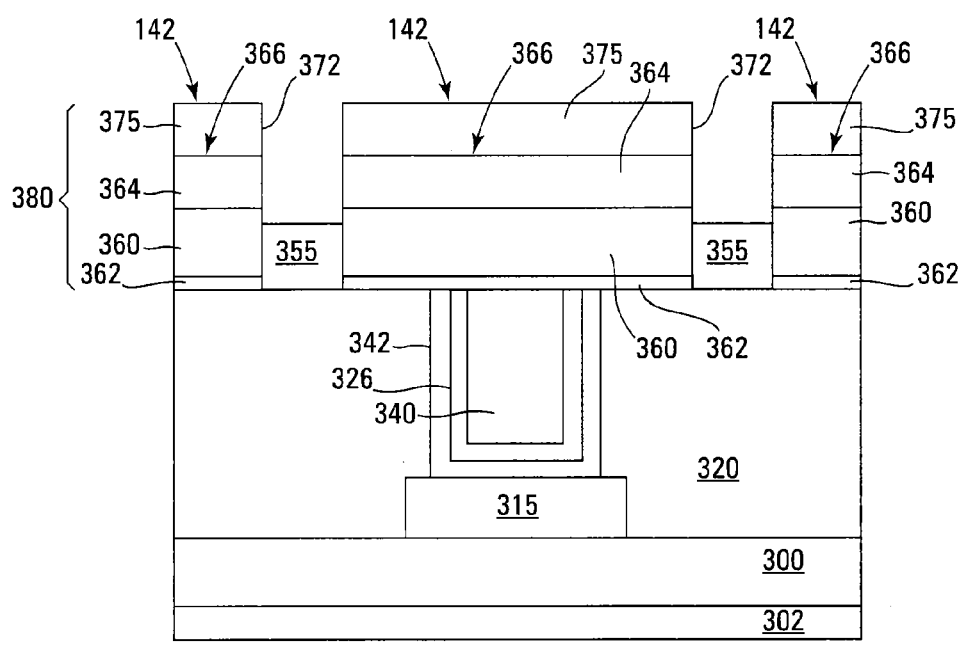

Portions of conductive material 370 substantially vertically aligned with (e.g., vertically aligned with) the openings 350 filled with conductive material 370 may then be removed, e.g., until the dielectric plugs 355 are exposed, as shown in FIG. 4D. In other words, portions of conductive material 370 substantially vertically aligned with (e.g., vertically aligned with) regions between adjacent pads 366, and thus dielectric plugs 355, are removed. The removal process may form openings 372 that may reopen the openings 350 filled with conductive material 370 and that expose dielectric plugs 355. For example, the portions of conductive material 370 may be removed after planarizing and/or buffing conductive material 370 for some embodiments.

For example, for some embodiments, a mask (not shown), e.g., imaging resist, such as photo-resist, may be formed over conductive material 370 and patterned to define the portions of conductive material 370 substantially vertically aligned with dielectric plugs 355 for removal. The portions defined for removal are subsequently removed, e.g., by etching, to form openings 372 that may respectively terminate on or within dielectric plugs 355, as shown in FIG. 4D.

Remaining portions of conductive material 370 may be referred to as conductive reflectors 375, one for each of the reflective pixel electrodes. Note that each conductive reflector 375 may be substantially vertically aligned (e.g., vertically aligned) with a respective one of the pads 366. For example, sidewalls of a conductive reflector 375 may be substantially flush (e.g., flush) with sidewalls of an underlying pad 366. That is, the sidewalls of a conductive reflector 375 may be substantially flush (e.g., flush) with the sidewalls of a barrier 364, the sidewalls of a conductor 360, and the sidewalls of a conductor 362 of the underlying pad 366.

Openings 372, containing dielectric plugs 355, define pixel electrodes 142, as shown in FIG. 4D. That is, openings 372, containing dielectric plugs 355, are between adjacent pixel electrodes 142 and electrically isolate the adjacent pixel electrodes 142 from each other. An upper surface of each conductive reflector 375 may form an upper reflective surface of a respective reflective pixel electrode 142, e.g., that receives incident light from light source 120 and reflects the incident light. For example, the upper surfaces of the conductive reflectors 375 of the pixel electrodes 142 form a reflective upper surface of a pixel array, such as pixel array 140 of FIGS. 1 and 2.

Each reflective pixel electrode 142 may include a conductive reflector 375 that may be over (e.g., in direct physical contact with) a barrier 364 that may be over (e.g., in direct physical contact with) a conductor 360 that may be over (e.g., in direct physical contact with) a conductor 362 that may be over (e.g., in direct physical contact with) a conductor 342 that may be over (e.g., in direct physical contact with) a conductor 315. Each conductive reflector 375 may be electrically and physically coupled to a conductor 315, e.g., by a barrier 364 and conductors 360, 362, and 342, as shown in FIG. 4D.

In other words, each reflective pixel electrode 142 may include a conductive reflector 375 that may be over (e.g., in direct physical contact with) a pad 366 that may be coupled to a conductor 315 by a conductor (e.g., a conductive via plug) 342. Openings 372 containing dielectric plugs 355 may electrically isolate and physically separate adjacent pixel electrodes 142 from each other. For some embodiments, a conductive reflector 375 and a pad 366 (e.g., conductive barrier 364, over conductor 360, over conductor 362) may form a conductor stack 380 of a pixel electrode 142, where each conductor stack 380 may be electrically coupled to a conductor 315 by a conductor 342.

Liquid crystal material 144 or alignment material 152 with liquid crystal material 144 thereover (FIG. 2) may deform into openings 372. However, when openings 372 are too deep, the deformation may be excessive, impacting the performance of the pixel array. Dielectric plugs 355 act to reduce the depth of openings 372, and thus act to reduce the deformation of liquid crystal material 144.

For some embodiments, the thickness of barrier 364 may be in the range from 30 angstroms to 500 angstroms, and for other embodiments, between 75 angstroms to 250 angstroms.

For thicknesses less than about 30 angstroms, barrier 364 might not provide sufficient barrier protection between conductor 360 and conductive reflector 375. For thicknesses of barrier 364 greater than about 500 angstroms, openings 372 may be too deep, e.g., possibly resulting in excessive deformation of liquid crystal material 144.

For thicknesses of barrier 364 in the range from 75 angstroms to 250 angstroms, deformation of liquid crystal material 144 is acceptable, and there is sufficient barrier protection between conductor 360 and conductive reflector 375. For a thickness of barrier 364 in the range from 75 angstroms to 250 angstroms, the reflectivity of conductor stack 380 is acceptable, without the thickness of barrier 364 being too thin so as not to function as a barrier and too thick so as to cause excessive deformation of liquid crystal material 144.

For some embodiments, the conductive material 346 of a conductor 360 may be selected, at least in part, according to its reflective properties. In that for some embodiments, e.g., for certain thicknesses of the overlying barrier 364, the reflectivity of conductor 360 may contribute to the overall reflectivity of conductor stack 380. For example, for a conductor 360 of aluminum over a conductor 362 of titanium, conductor 360 may have a reflectivity of about 0.920, 0.919, and 0.904 respectively for incident blue (475-nanometer), green (510-nanometer), and red (650-nanometer) light.

For some embodiments, the thickness of a conductive reflector 375 may be in the range from 250 angstroms and 1000 angstroms. For thicknesses less than 250 angstroms, conductive reflector 375 may become rough, thereby causing a reduction in reflectivity. For thicknesses greater than 1000 angstroms, the reflectivity of conductive reflector 375 does not change much, and there may be a danger of openings 372 becoming too deep.

It was determined experimentally that the reflectivity of a conductor stack 380 having a barrier 364 of tantalum or tantalum nitride between a conductor 360 of aluminum and a conductive reflector 375 of silver might be increased by about 0.9 percent and about 0.6 percent, respectively for incident blue (475-nanometer) and green (510-nanometer) light over the reflectivity of a conductor stack 380 having a barrier 364 of titanium nitride between a conductor 360 of aluminum and a conductive reflector 375 of silver.

For red (650 nanometer) light it was determined experimentally that the reflectivity of a conductor stack 380 having a barrier 364 of tantalum between a conductor 360 of aluminum and a conductive reflector 375 of silver might be increased by about 0.2 percent over the reflectivity of a conductor stack 380 having a barrier 364 of titanium nitride between a conductor 360 of aluminum and a conductive reflector 375 of silver. For red light it was determined experimentally that the reflectivity of a conductor stack 380 having a barrier 364 of tantalum nitride between a conductor 360 of aluminum and a conductive reflector 375 of silver might be increased by about 0.3 percent over the reflectivity of a conductor stack 380 having a barrier 364 of titanium nitride between a conductor 360 of aluminum and a conductive reflector 375 of silver.

For embodiments where a conductor 360 may be of titanium, titanium nitride, or tungsten, diffusion between conductor 360 and conductive reflector 375 may be less than when conductor 360 is of silver or copper. However, a barrier 364 of tantalum nitride may still be used to improve reflection from a conductor stack 380 with a conductor 360 of titanium, titanium nitride, or tungsten.

It was determined experimentally that the variation in reflectivity over a wafer having conductor stack 380 with a barrier 364 of tantalum or tantalum nitride between a conductor 360 of aluminum and a conductive reflector 375 of silver might be reduced by about 0.29 percent, about 0.18 percent, and about 0.06 percent, respectively for incident blue (475-nanometer), green (510-nanometer), and red (650-nanometer) light, below the variation in reflectivity over a wafer having conductor stack 380 with a barrier 364 of titanium nitride between a conductor 360 of aluminum and a conductive reflector 375 of silver.

It was determined experimentally that forming a conductive reflector 375 of silver on a barrier 364 of titanium nitride typically produced a conductive reflector 375 having a substantially (e.g., having a) polycrystalline structure, e.g., with the (111), (200), (220), and (311) planes oriented substantially parallel (e.g., parallel) to the upper surface of conductive reflector 375. However, it was determined experimentally that forming a conductive reflector 375 of silver on a barrier 364 of tantalum or tantalum nitride could produce a conductive reflector 375 having a polycrystalline structure with a substantially single (e.g., a single) texture, e.g., with the (220) plane substantially parallel (e.g., parallel) to the upper surface of conductive reflector 375.

It is believed that the substantially single texture associated with forming a conductive reflector 375 of silver on a barrier 364 of tantalum or tantalum nitride is at least partially responsible for increased reflectivity of the conductor stack 380 having a barrier 364 of tantalum or tantalum nitride between a conductor 360 of aluminum and a conductive reflector 375 of silver compared to the reflectivity of a conductor stack 380 having a barrier 364 of titanium nitride between a conductor 360 of aluminum and a conductive reflector 375 of silver.

Each conductor 315, and thus each pixel electrode 142, may be selectively electrically coupled to one or more voltage sources (not shown), and common conductor 150 may be coupled to a third voltage source (not shown). For some embodiments, each pixel electrode 142 may be selectively coupled to first and second voltage sources for selectively applying a first voltage of the first voltage source or a second voltage of the second voltage source to the respective pixel electrode 142. For example, selectively applying the first voltage to the respective pixel electrode 142 may turn the respective pixel 142 ON, e.g., while common conductor 150 is coupled to the third voltage source, and selectively applying the second voltage to the respective pixel 142 may turn the respective pixel 142 OFF, e.g., while common conductor 150 is coupled to the third voltage source. For some embodiments, common conductor 150 may remain at a fixed voltage, e.g., the voltage of the third voltage source, while the first and second voltages are selectively applied to the respective pixel electrode 142.

FIGS. 6A-6D are cross-sectional views of the portion of the reflective pixel array in FIG. 3 during various stages of fabrication subsequent to the particular stage of fabrication of FIG. 3, according to another embodiment. For example, FIGS. 6A-6D illustrate another embodiment of the formation of conductor stacks 380 of reflective pixel electrodes 142. Common numbering is used to denote similar (e.g., the same) elements in FIGS. 4A-4D and FIGS. 6A-6D.

Figure 6A:
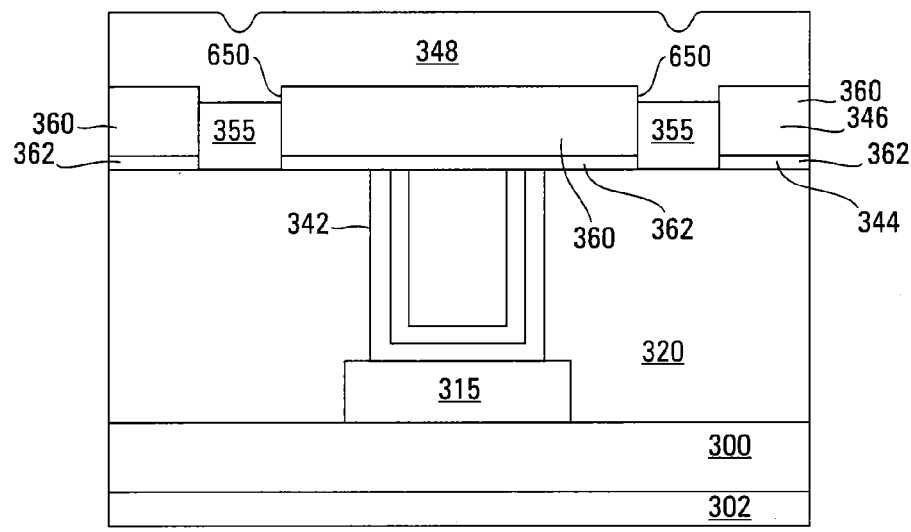
FIGS. 6A-6D are cross-sectional views of the portion of the reflective pixel array in FIG. 3 during various stages of fabrication subsequent to the particular stage of fabrication of FIG. 3, according to another embodiment.

In FIG. 6A, openings 650 may be formed by patterning conductive material 346 and removing portions of conductive material 346 and portions of conductive material 344 exposed by patterned conductive material 346. For example, for some embodiments, a mask (not shown), e.g., imaging resist, such as photo-resist, may be formed over conductive material 346 and patterned to define regions of conductive material 346 and conductive material 344 for removal. The regions defined for removal are subsequently removed, e.g., by etching, to form openings 650 that may respectively terminate on or within dielectric 320.

Each remaining portion of conductive material 344 forms a conductor 362, and each remaining portion of conductive material 346 forms a conductor 360. A dielectric plug 355 may then be formed in each of openings 650 between adjacent conductors 360 and between adjacent conductors 362, so that upper surfaces of the dielectric plugs 355 are recessed within the respective openings 650, e.g., below an upper surface of conductors 360, as shown in FIG. 6A.

Barrier material 348 may then be formed over (e.g., in direct physical contact with) conductors 360 and in openings 650 over dielectric plugs 355, as shown in FIG. 6A. For example, barrier material 348 may be deposited using blanket deposition, such as physical vapor deposition or chemical vapor deposition. Note that barrier material 348 may overfill the remainder of each of openings 650 above a respective dielectric plug 355. Barrier material 348 may then be planarized for some embodiments.

Figure 6B:
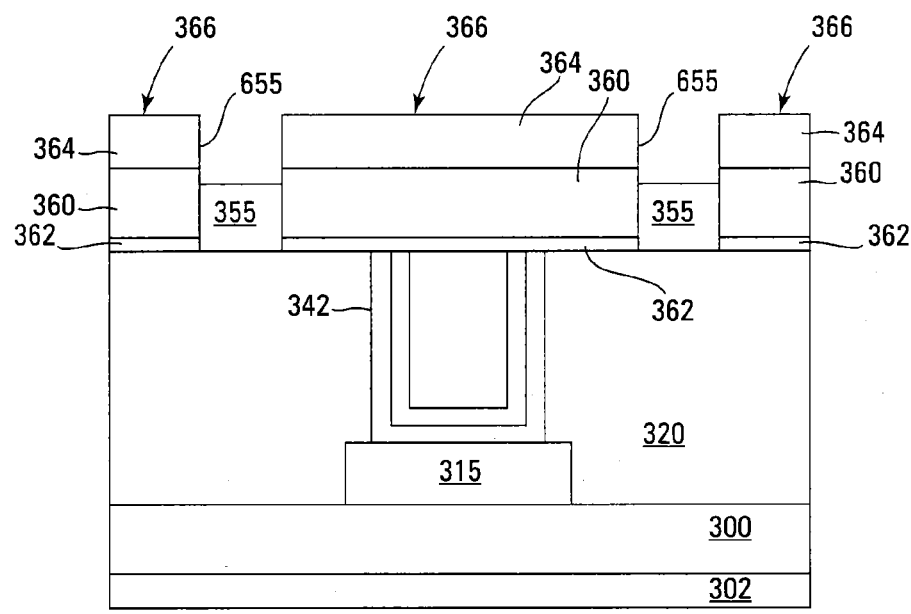

Portions of barrier material 348 substantially vertically aligned with (e.g., vertically aligned with) the openings 650 filled with barrier material 348 may then be removed, e.g., until the dielectric plugs 355 are exposed, as shown in FIG. 6B. The removal process may form openings 655 that may reopen the openings 650 filled with barrier material 348 and that expose dielectric plugs 355. For example, the portions of barrier material 348 may be removed after planarizing barrier material 348 for some embodiments.

For example, for some embodiments, a mask (not shown), e.g., imaging resist, such as photo-resist, may be formed over barrier material 348 and patterned to define the portions of barrier material 348 substantially vertically aligned with dielectric plugs 355 for removal. The portions defined for removal are subsequently removed, e.g., by etching, to form openings 655 that may respectively terminate on or within dielectric plugs 355, as shown in FIG. 6B.

The remaining portions of barrier material 348 form barriers 364, one for each of the reflective pixel electrodes. Note that the structure including a barrier 364 over a conductor 360 that is over a conductor 362 forms a pad 366 of a reflective pixel electrode, as shown in FIG. 6B.

Figure 6C:
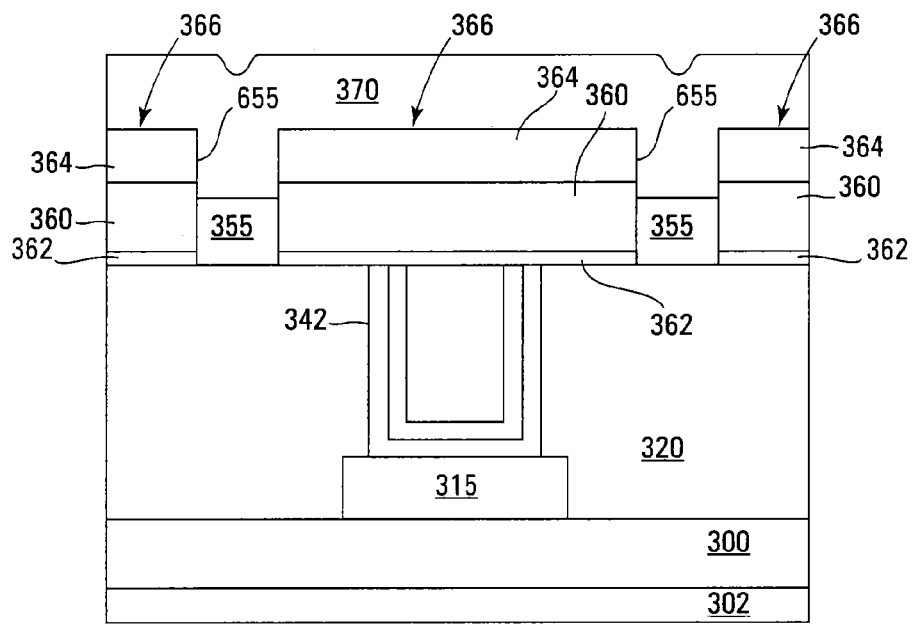

Reflective conductive material 370 may then be formed over (e.g., in direct physical contact with) barriers 364 of pads 366 and in openings 655 over dielectric plugs 355 in FIG. 6C. Conductive material 370 may then be planarized, e.g., using CMP. For some embodiments, the upper surface of conductive material 370 may be buffed as part of a buff CMP to reduce the roughness of the upper surface of conductive material 370.

Figure 6D:
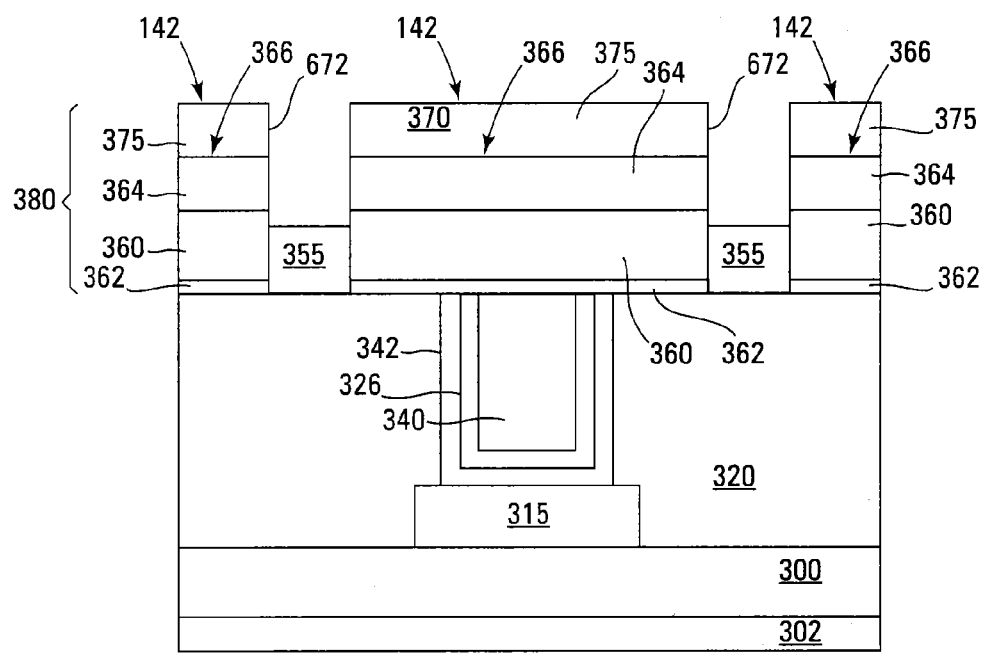

Portions of conductive material 370 substantially vertically aligned with (e.g., vertically aligned with) the openings 655 filled with conductive material 370 may then be removed, e.g., until the dielectric plugs 355 are exposed, as shown in FIG. 6D. The removal process may form openings 672 that may reopen the openings 655 filled with conductive material 370 and that expose dielectric plugs 355. For example, the portions of conductive material 370 may be removed after planarizing and/or buffing conductive material 370 for some embodiments.

For example, for some embodiments, a mask (not shown), e.g., imaging resist, such as photo-resist, may be formed over conductive material 370 and patterned to define the portions of conductive material 370 substantially vertically aligned with dielectric plugs 355 for removal. The portions defined for removal are subsequently removed, e.g., by etching, to form openings 672 that may respectively terminate on or within dielectric plugs 355, as shown in FIG. 6D. The remaining portions of conductive material 370 form conductive reflectors 375, one for each of the reflective pixel electrodes 142.

Figure 7A:
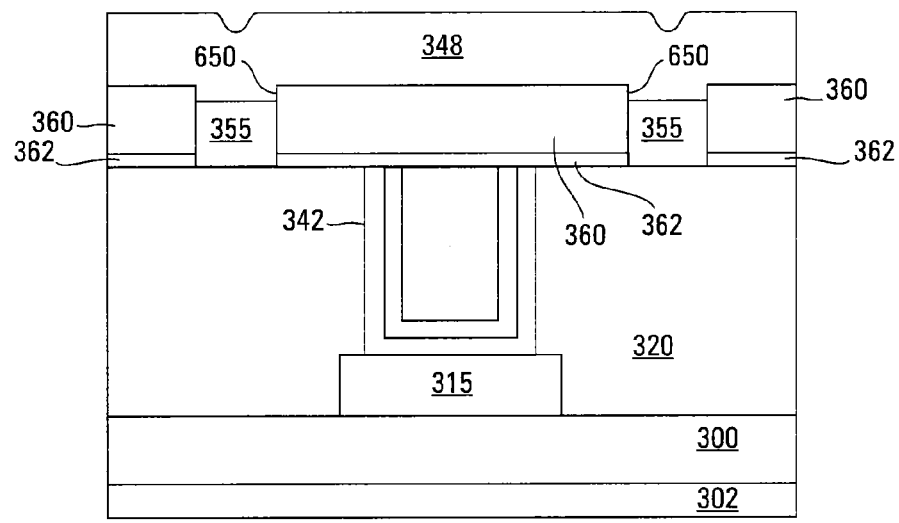
FIGS. 7A-7C are cross-sectional views of the portion of the reflective pixel array in FIG. 3 during various stages of fabrication subsequent to the particular stage of fabrication of FIG. 3, according to another embodiment.
Figure 7B:
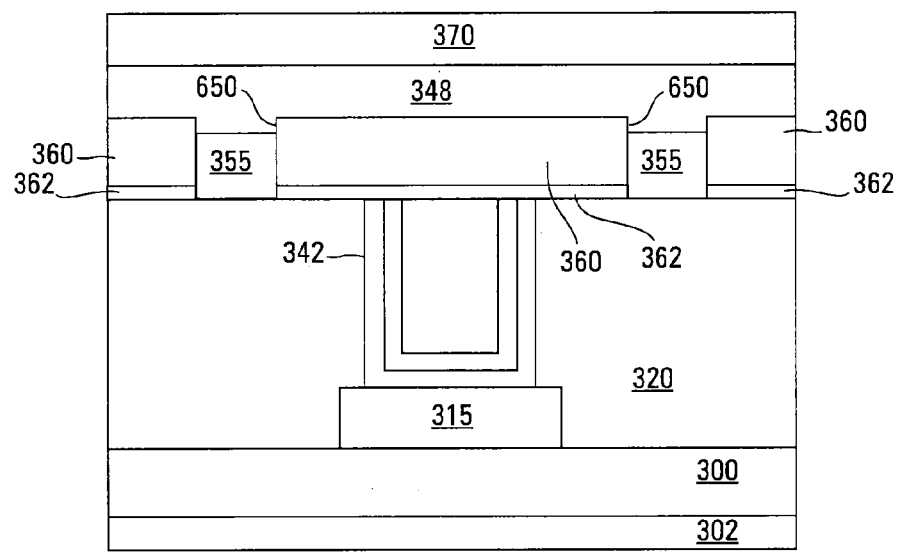
Figure 7C:
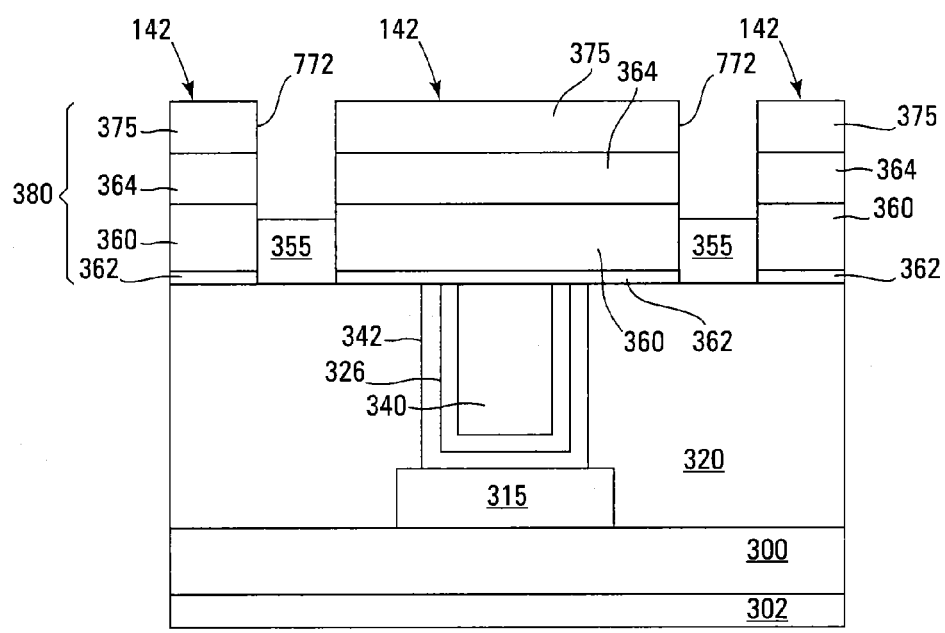

FIGS. 7A-7C are cross-sectional views of the portion of the reflective pixel array in FIG. 3 during various stages of fabrication subsequent to the particular stage of fabrication of FIG. 3, according to another embodiment. For example, FIGS. 7A-7C illustrate another embodiment of the formation of conductor stacks 380 of reflective pixel electrodes 142. Common numbering is used to denote similar (e.g., the same) elements in FIGS. 4A-4D, FIGS. 6A-6D, and FIGS. 7A-7C.

The structure 7A is substantially the same (e.g., the same as) FIG. 6A and may be formed in substantially the same manner (e.g., the same manner) as described above in conjunction with FIG. 6A. Barrier material 348 may be planarized for some embodiments, as shown in FIG. 7B.

Reflective conductive material 370 may then be formed over (e.g., in direct physical contact with) barrier material 348, and, for some embodiments, may be planarized, as shown FIG. 7B. The upper surface of conductive material 370 may be buffed as part of a buff CMP to reduce the roughness of the upper surface of conductive material 370.

Portions of reflective conductive material 370 and barrier material 348 substantially vertically aligned with (e.g., vertically aligned with) the openings 650 filled with barrier material 348 may then be removed, e.g., until the dielectric plugs 355 are exposed, as shown in FIG. 7C. The removal process may form openings 772 that may reopen the openings 650 filled with barrier material 348 and that expose dielectric plugs 355. For example, the portions of conductive material 370 may be removed after planarizing and/or buffing conductive material 370 for some embodiments.

For example, for some embodiments, a mask (not shown), e.g., imaging resist, such as photo-resist, may be formed over reflective conductive material 370 and patterned to define regions of reflective conductive material 370 and barrier material 348 for removal. The portions defined for removal are subsequently removed, e.g., by etching, to form openings 772 that may respectively terminate on or within dielectric plugs 355, as shown in FIG. 7C.

Each remaining portion of barrier material 348 forms a barrier 364 of a respective conductor stack 380 and a respective pixel electrode 142, and each remaining portion of reflective conductive material 370 forms a conductive reflector 375 of the respective conductor stack 380 and the respective pixel electrode 142.

Figure 8A:
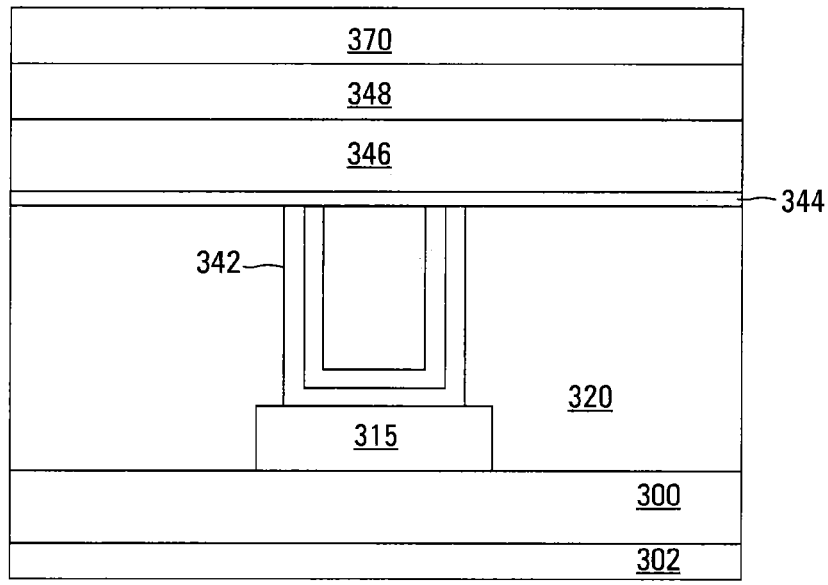
FIGS. 8A-8B are cross-sectional views of the portion of the reflective pixel array in FIG. 3 during various stages of fabrication subsequent to the particular stage of fabrication of FIG. 3, according to another embodiment.
Figure 8B:
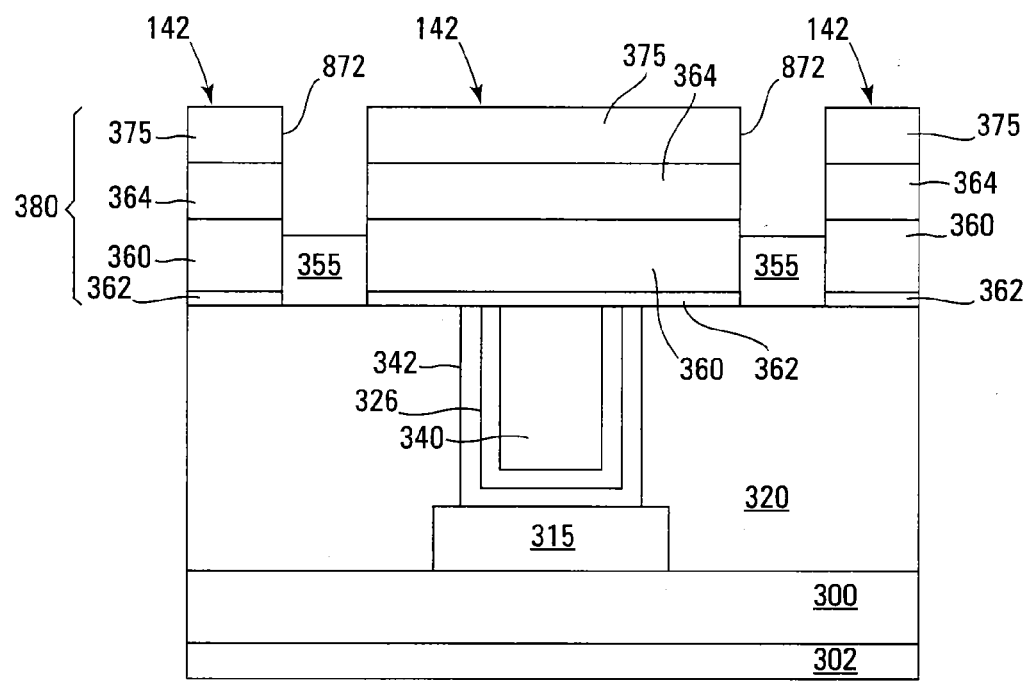

FIGS. 8A-8B are cross-sectional views of the portion of the reflective pixel array in FIG. 3 during various stages of fabrication subsequent to the particular stage of fabrication of FIG. 3, according to another embodiment. For example, FIGS. 8A-8B illustrate another embodiment of the formation of conductor stacks 380 of reflective pixel electrodes 142. Common numbering is used to denote similar (e.g., the same) elements in FIGS. 4A-4D and FIGS. 8A-8B.

In FIG. 8A, barrier material 348 is formed over (e.g., in direct physical contact with) conductive material 346, and reflective conductive material 370 is formed over (e.g., in direct physical contact with) barrier material 348. For some embodiments, reflective conductive material 370 may then be buffed as part of a buff CMP to reduce the roughness of the upper surface of conductive material 370.

Portions of reflective conductive material 370, portions of barrier material 348, portions of conductive material 346, and portions of conductor 344 may then be removed, stopping on or within dielectric 320 as shown in FIG. 8B. The removal process may form openings 872 that may respectively terminate on or within dielectric 320. For example, the portions of conductive material 370 may be removed after planarizing and/or buffing conductive material 370 for some embodiments.

For example, for some embodiments, a mask (not shown), e.g., imaging resist, such as photo-resist, may be formed over reflective conductive material 370 and patterned to define regions of reflective conductive material 370, barrier material 348, conductive material 346, and conductive material 344 for removal. The regions defined for removal are subsequently removed, e.g., by etching, to form openings 872 that may respectively terminate on or within dielectric 320.

A dielectric plug 355 may then be formed in each of openings 350, as shown in FIG. 8B. Each remaining portion of conductive material 344 forms a conductor 362 of a respective conductor stack 380 and a respective pixel electrode 142. Each remaining portion of conductive material 346 forms a conductor 360 of the respective conductor stack 380 and the respective pixel electrode 142. Each remaining portion of barrier material 348 forms a barrier 364 of the respective conductor stack 380 and the respective pixel electrode 142. Each remaining portion of reflective conductive material 370 forms a conductive reflector 375 of the respective conductor stack 380 and the respective pixel electrode 142.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A reflective spatial light modulator for a display device, comprising:
a plurality of reflective pixel electrodes, wherein each reflective pixel electrode comprises:
a conductor;
a tantalum containing barrier over the conductor; and
a conductive reflector over the tantalum containing barrier, wherein the conductor comprises a conductive material selected from the group consisting of titanium, titanium nitride and tungsten.

2. The reflective spatial light modulator of claim 1, wherein the tantalum containing barrier comprises a material selected from the group consisting of tantalum nitride and tantalum.

3. A reflective spatial light modulator for a display device, comprising:
a plurality of reflective pixel electrodes, wherein each reflective pixel electrode comprises:
a conductor;
a tantalum containing barrier over the conductor; and
a conductive reflector over the tantalum containing barrier, wherein the conductor comprises a conductive material selected from the group consisting of titanium, titanium nitride, and tungsten, the conductive reflector comprises a conductive material selected from the group consisting of silver, gold, cobalt, and nickel, and the tantalum containing barrier comprises tantalum nitride.

4. The reflective spatial light modulator of claim 1, wherein the tantalum containing barrier has a thickness in the range from 30 angstroms to 500 angstroms.

5. The reflective spatial light modulator of claim 4, wherein tantalum containing barrier has a thickness in the range from 75 angstroms to 250 angstroms.

6. The reflective spatial light modulator of claim 1, wherein the conductive reflector has a thickness in the range from 250 angstroms to 1000 angstroms.

7. The reflective spatial light modulator of claim 1, further comprising liquid crystal material over the plurality of reflective pixel electrodes.

8. The reflective spatial light modulator of claim 7, further comprising a transparent conductor over the liquid crystal material.

9. The reflective spatial light modulator of claim 1, wherein adjacent pixel electrodes are separated from each other by openings.

10. The reflective spatial light modulator of claim 9, wherein each opening contains a dielectric plug.

11. A reflective pixel array for a display device, comprising:
a plurality of reflective pixel electrodes, wherein each reflective pixel electrode comprises:
a tantalum nitride barrier between a silver reflector and a conductor selected from the group consisting of titanium, titanium nitride, and tungsten, wherein an upper surface of the silver reflector forms an upper reflective surface of the reflective pixel electrode configured to receive and reflect incident light.

12. A liquid crystal display device, comprising:
a plurality of conductor stacks, each conductor stack coupled to a first conductor by a conductive via plug, each conductor stack corresponding to a reflective pixel of the liquid crystal display device;
liquid crystal material over the plurality of conductor stacks; and
a transparent second conductor over the liquid crystal material;
wherein each conductor stack comprises:
a third conductor over the conductive via plug so that the conductive via plug is between the first conductor and the third conductor;
a tantalum containing barrier over the third conductor; and
a conductive reflector over the tantalum containing barrier,
wherein the third conductor is comprises a conductive material selected from the group consisting of titanium, titanium nitride, and tungsten,
wherein the conductive reflector comprises a conductive material selected from the group consisting of silver, gold, cobalt, and nickel, and the tantalum containing barrier comprises tantalum nitride.

13. A liquid crystal display device, comprising:
a plurality of conductor stacks, each conductor stack coupled to a first conductor by a conductive via plug, each conductor stack corresponding to a reflective pixel of the liquid crystal display device;
liquid crystal material over the plurality of conductor stacks; and
a transparent second conductor over the liquid crystal material,
wherein each conductor stack comprises:
a third conductor over the conductive via plug so that the conductive via plug is between the first conductor and the third conductor;
a tantalum containing barrier over the third conductor; and
a conductive reflector over the tantalum containing barrier, and a fourth conductor between the third conductor and the conductive via plug.

14. A liquid crystal display device, comprising:
a plurality of conductor stacks, each conductor stack coupled to a first conductor by a conductive via plug, each conductor stack corresponding to a reflective pixel of the liquid crystal display device;
liquid crystal material over the plurality of conductor stacks; and
a transparent second conductor over the liquid crystal material,
wherein each conductor stack comprises:
a third conductor over the conductive via plug so that the conductive via plug is between the first conductor and the third conductor;
a tantalum containing barrier over the third conductor; and
a conductive reflector over the tantalum containing barrier, and
wherein the conductive via plug comprises:
a conductive liner; and
a fourth conductor over the conductive liner.

15. The liquid crystal display device of claim 14, wherein the conductive liner comprises adhesion material at least over the first conductor and barrier material between at least the adhesion material and the fourth conductor.

16. The liquid crystal display device of claim 12, wherein the liquid crystal material is selected from the group consisting of ferroelectric liquid crystal material and nematic liquid crystal material.

17. The liquid crystal display device of claim 12, wherein the transparent second conductor comprises indium tin oxide.

18. The liquid crystal display device of claim 12, wherein adjacent conductor stacks are separated from each other by openings, wherein each opening contains a dielectric plug recessed below upper surfaces of the conductor stacks.

19. The liquid crystal display device of claim 12, further comprising alignment material between the liquid crystal material and the transparent second conductor and/or between the liquid crystal material and the plurality of conductor stacks.

20. The liquid crystal display device of claim 12, wherein first conductor is selectively coupled to one or more voltage sources and the transparent second conductor is coupled to a voltage source different than the one or more voltage sources to which the first conductor is selectively coupled.

* * * * *